United States Patent [19]

Block et al.

[11] Patent Number: 4,488,967
[45] Date of Patent: Dec. 18, 1984

[54] TREATMENT OF WASTEWATER CONTAINING PHOSPHORUS COMPOUNDS

[75] Inventors: Charles S. Block, Allentown; Sun-Nan Hong, Emmaus, both of Pa.

[73] Assignee: Air Products and Chemicals, Inc., Allentown, Pa.

[21] Appl. No.: 472,452

[22] Filed: Mar. 7, 1983

[51] Int. Cl.³ .............................................. C02F 3/30
[52] U.S. Cl. .................................. 210/605; 210/625; 210/903; 210/906
[58] Field of Search ............... 210/605, 621, 622, 627, 210/625, 630, 903, 906

[56] References Cited

U.S. PATENT DOCUMENTS

| 3,654,147 | 4/1972 | Levin et al. | 210/903 X |
| 3,730,882 | 5/1973 | Levin et al. | 210/6 |
| 3,756,946 | 9/1973 | Levin et al. | 210/6 |
| 3,994,802 | 11/1976 | Casey et al. | 210/5 |
| 4,056,465 | 11/1977 | Spector | 210/7 |
| 4,183,808 | 1/1980 | Drnevich | 210/5 |
| 4,271,026 | 6/1981 | Chen et al. | 210/605 |

OTHER PUBLICATIONS

Davelaar, D. et al., "Water SA", vol. 4, No. 2, Apr. 1978, pp. 54 to 60.

Primary Examiner—Thomas Wyse
Attorney, Agent, or Firm—Thomas G. Ryder; E. Eugene Innis; James C. Simmons

[57] ABSTRACT

Wastewater containing phosphorus values and BOD is initially admixed with recycled sludge containing activated biomass under anaerobic conditions, then contacted with oxygen-containing gas, followed by separation of a dense sludge layer from the mixed liquor. A portion of the sludge layer, containing the activated biomass, is held under non-aeration conditions for sufficient time to reduce any nitrates and/or nitrites contained therein, before admixture of the recycled sludge with the wastewater influent.

2 Claims, 1 Drawing Figure

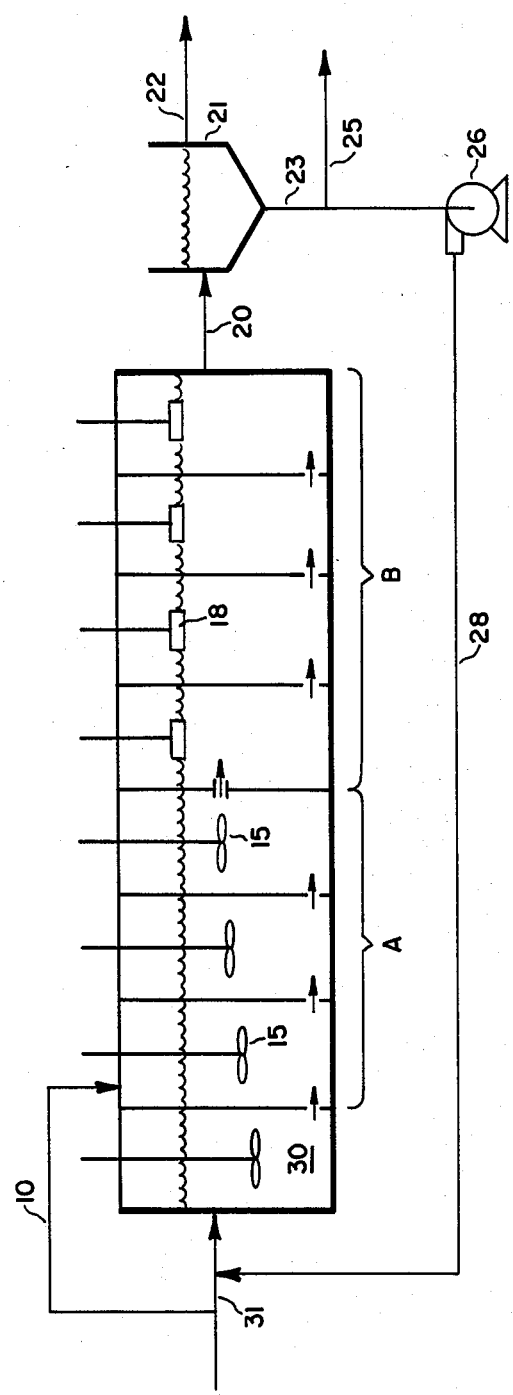

TREATMENT OF WASTEWATER CONTAINING PHOSPHORUS COMPOUNDS

TECHNICAL FIELD

The present invention relates to biological systems for treatment of wastewater, wherein recycled activated biomass is utilized for removal from the wastewater of pollutants causing degradation of water quality.

BACKGROUND OF THE PRIOR ART

Activated sludge systems for treatment of municipal and industrial wastewaters are well known in the art. In the older and more conventional of these systems the wastewater, usually after an initial primary sedimentation for removal of contained solids, is subjected to oxidative treatment with atmospheric air or a gas stream of higher oxygen concentration in one or more treating stages, in the presence of biomass obtained by secondary clarification or sedimentation of the oxidized liquid product to separate out a dense solids-containing fraction, constituting the activated sludge recycled to the oxidative treatment for admixture with the wastewater influent.

In addition to methods employing chemical precipitation of phosphates for their removal from treated wastewaters, attempts were made to effect removal of phosphates by modification of operating conditions in conventional aerobic activated sludge wastewater treating systems with or without inclusion of a chemical precipitation step. Thus, in Levin, U.S. Pat. No. 3,236,766, the suggested process principally involves mixing the wastewater influent with part of the recycled sludge and subjecting the obtained mixed liquor to oxygenation and aeration. Following froth floatation of the aerated mixed liquor, a separated sludge fraction is sent to a "phosphate stripper and sludge thickener" where it is adjusted to acidic conditions and is maintained "in a non-aerated or anaerobic condition for about 10 to 20 minutes". As a result of these conditions, patentee indicates, considerable quantities of intracellular phosphate are induced to leak out of the sludge into the liquid phase which is withdrawn and subjected to chemical precipitation of phosphates therein. The phosphate-depleted sludge produced in the stripper-thickener is preferably re-aerated, the pH adjusted to the non-acid condition and introduced to the flash mixer for admixture with the wastewater influent. Among other alternative modifications suggested in the patent, the aerated mixed liquor may be sent to a settling basin and a portion of the settled sludge therefrom sent to the phosphate stripper-sludge thickener.

In U.S. Patents to G. V. Levin et al., U.S. Pat. Nos. 3,730,882 and 3,756,946, the aerated mixed liquor is passed to a settling zone containing an anaerobic layer of sludge into which layer the phosphate, which was taken up by the cells of the biomass during the aeration stage, is settled and a substantially phosphate-free effluent is removed from above the sludge layer. By maintaining the sludge layer under anaerobic conditions for sufficient time, according to the U.S. Pat. No. 3,730,882, the organisms therein are caused to release phosphate to the liquid phase. A phosphate precipitant is added to precipitate the soluble phosphate and phosphate-depleted sludge containing precipitated phosphate particles is recycled for admixture with the influent sewage entering the aeration zone. According to the U.S. Pat. No. 3,756,946, sludge containing soluble phosphate in the liquid phase is removed from the settling zone and then treated to separate out a phosphate-enriched aqueous phase and to provide a sludge having a higher concentration of solids with a lower phosphate concentration, which sludge is recycled for admixture with the sewage influent going to the aeration zone.

In U.S. Pat. No. 4,183,808 to Drnevich, a variation of the scheme of Levin is described in which sludge removed from the settling zone is treated to the extent necessary to release into the liquid phase in soluble form phosphorus contained in the biomass. The solubilized phosphate containing sludge is then recycled for admixture with sewage influent going to the aeration zone.

According to Casey et al. U.S. Pat. No. 3,994,802, nitrogenous pollutants in addition to carbonaceous BOD are removed from wastewater in a multistage activated sludge treating process, wherein the recycled sludge is admixed with the influent wastewater in the presence of sufficient oxygen to maintain oxic conditions and the treated mixed liquor from the oxic stage is passed to an anoxic stage wherein the $NO_x^-$ (nitrates and nitrites), formed by the oxidation of ammonium compounds, is reduced to nitrogen gas, which is discharged. After one or more of such successive oxic and anoxic treating stages, the mixed liquor is subjected to solids separation, and the separated solids fraction, constituting the activated sludge, is recycled to at least the initial mixing stage. A short residence time, resulting in a high food to biomass ratio, is maintained in the initial oxic stage or the first subsection thereof, to avoid sludge bulking and to promote production of an active dense biomass. The patent cites earlier nitrification-denitrification techniques described in the literature.

As employed in said U.S. Pat. No. 3,994,802, the term "anoxic" refers to a condition of low oxygen tension, under which condition nitrates and nitrites are reduced to nitrogen gas. The term "oxic" refers to conditions of sufficiently high oxygen tension whereby nitrifying bacteria present in activated sludge will convert nitrogenous compounds into nitrates and/or nitrites.

The effective removal of contained phosphates from wastewater in a modified activated sludge process is disclosed in Spector U.S. Pat. No. 4,056,465. According to this patent the BOD-containing wastewater and recycled sludge are initially admixed under anaerobic conditions in the substantial absence of oxygen or oxidizing agents, followed by aeration, and subsequent clarification to separate out the activated sludge for recycle. The patented operation is designed to promote selective production of nonbulking biomass while obtaining desired high removal of phosphates. By an alternative modification described in said patent, nitrates and nitrites are also removed from the wastewater by interposing an anoxic treating zone between the anaerobic zone and the aerating zone. The pertinent disclosure of U.S. Pat. No. 4,056,465 is incorporated herein by reference thereto.

Process of the type described in said U.S. Pat. No. 4,056,465, employing in an activated sludge wastewater treating process an anaerobic mixing and treating zone followed by an oxic aerating zone, have become known as A/O systems, whereas those systems having an intermediate anoxic treating zone between the anaerobic and oxic zones are referred to as "A/A/O" or "$A^2$/O" systems.

Further improvements in systems of the A/O and $A^2$/O type are disclosed in U.S. Pat. No. 4,271,026. By maintaining both the F/M ratio and the BOD/P ratio within particular ranges therein set out and preferably relative to one another, enhanced phosphorus removal is assured while operating at an adequately high throughput rate. The initial admixing of the wastewater influent and recycled sludge is carried out under strictly anaerobic conditions, in the substantial absence of oxygen and oxidizing agents, such that the mixed liquor has a D.O. content of less than about 0.7 ppm. In the subsequent oxygenation treatment a dissolved oxygen content of at least 1 ppm is maintained. Within the entire process system encompassing the initial anaerobic treatment and extending through the oxygenation, including any intervening anoxic treating step if used, the BOD/P ratio is maintained from about 5:1 up to about 50:1 and the food to biomass (F/M) ratio from about 0.09 up to an upper limit of about 1.4.

In an article by Davelaar et al., titled "The Significance of an Anaerobic Zone for the Biological Removal of Phosphate from Wastewaters" (Water, S. A. Vol. 4, No. 2, April 1978, pages 54 to 60), the authors describe certain of the theories advanced with respect to the function of the anaerobic zone, particularly with respect to phosphate removal and the adverse effect on phosphate removal by the presence of nitrate in the inflow to the anaerobic zone. The article compares experimental results obtained in the laboratory scale operation of two activated sludge units designated A and B. In the B unit the sewage influent and recycled sludge were admixed in an anoxic zone and flowed therefrom to an aerobic zone, followed by solids separation to recycle the settled activated sludge fraction to the anoxic zone. In the A unit an anaerobic zone was interposed between the anoxic and aerobic zones. Unit A, with the interposed anaerobic stage, was found to have superior phosphate removal ability.

In previous laboratory and pilot plant studies leading to the development of the present invention, it was observed that the introduction of nitrates and/or nitrites ($NO_x^-$) in the anaerobic zone of an A/O system interfered with the phosphorus-removing organisms, as a result of which there is an overall reduced level of P removal. Unless resort is had to the use of specific nitrification inhibitors, the A/O system would have to be operated at a high F/M in order to preclude growth of nitrifying bacteria as is known to the art, or operation with a sludge retention time in the clarifier sufficient to assure nitrification prior to admission of recycle sludge to the initial anaerobic zone. In this latter case there is the possibility of producing sufficient bubbles to elemental nitrogen by denitrification of NOX such that settled sludge may be carried to the surface of the clarifier by rising bubbles of nitrogen gas. This phenomenon produces unsatisfactory total suspended solids level.

As herein employed the terms "anaerobic", "anoxic" and "oxic" have the following definitions:

"Anaerobic" refers to a state existing within a wastewater treating zone which is substantially free of $NO_x^-$ and the dissolved oxygen level (DO) is less than 0.7 ppm.

"Anoxic" refers to the state maintained in a wastewater treating zone wherein nitrates and/or nitrites are utilized to metabolize BOD, while dissolved oxygen levels are maintained at below 0.7 ppm. The nitrates and/or nitrites are thereby reduced to elemental $N_2$ gas.

"Oxic" refers to that state in a wastewater treating zone wherein oxygen-containing gas is utilized for oxygenation therein and the dissolved oxygen level is maintained at above about 1 ppm.

BRIEF SUMMARY OF THE INVENTION

According to the present invention the basic A/O flow scheme is followed with the initial mixing of influent wastewater and recycled sludge being carried out under anaerobic conditions and the obtained mixed liquor subsequently subjected to treatment with oxygen-containing gas under oxic conditions, following by settling of the thus treated liquor to separate out a dense sludge fraction, a portion of which is recycled to the anaerobic treating zone for admixture with influent wastewater. In accordance with the modification introduced by the present invention, however, a sludge recycle holding zone is incorporated in the flow system to provide a certain detention time for the separated recycle sludge to endogenously denitrify the recycle stream and thereby eliminate $NO_x^-$ contained therein as a result of nitrification occurring in the oxic zone.

In the preferred embodiment of the invention, the sludge recycle holding zone is provided by an extra basin arranged prior to the basic A/O system, which extra basin can be utilized to remove $NO_x^-$ contained in the recycle sludge to release the $N_2$ produced in a manner harmless to the clarifier. Thus, the liquor entering the anaerobic zone of the A/O system will be substantially free of $NO_x^-$ while soluble BOD in the influent wastewater is preserved for sorption of phosphorus released by hydrolysis of polyphosphate contained within microorganism in the anaerobic zone.

The method of this invention provides an independent need for the reduction of $NO_x$ in the recycle sludge at a point wherein the release of nitrogen is not harmful to the system and wherein the quantity of $NO_x$ recycle to the anaerobic zone can be reduced to satisfactory levels. This invention permits an A/O system to be operated with any degree of nitrification and still achieve zero $NO_x$ in the recycle sludge to the anaerobic zone.

The operation in accordance with the invention will be understood and certain of its advantages better appreciated from the detailed description which follows read in conjunction with the accompanying drawings.

BRIEF DESCRIPTION OF THE DRAWING

The single FIGURE of the accompanying drawing is a simplified flow diagram of a modified A/O system according to the invention.

DETAILED DESCRIPTION OF THE INVENTION

Referring to the drawing, there is shown a wastewater treating system comprising an anaerobic zone designated A and an oxic zone designated B, each of which zones comprises one or more treating sections. While in the drawing the anaerobic zone is shown as comprised of three such treating sections and the oxic zone of four such treating sections, it will be understood that the choice of the number of sections will be governed by factors other than concerns the practice of the present invention and may be that previously employed in systems of the A/O type.

As in previously known A/O systems, such as for example, those described in U.S. Pat. No. 4,056,465, the influent wastewater is introduced into the initial section of the anaerobic zone A by line 10 wherein it is admixed with recycle sludge. The treating sections of zone A are maintained under anaerobic conditions by avoiding the introduction of oxygen by means previously described in the U.S. Pat. No. 4,056,465.

The mixed liquor passes in plug flow through the several sections of the anaerobic zone and then into the oxic zone B. Each of the treating sections in zone A is equipped with stirring means 15 to obtain effective contact between the biomass and the mixed liquor.

Aeration or oxygenation of the mixed liquor in zone B may be effected by sparging air or oxygen-containing gas of higher $O_2$ concentration into the several sections of said zone or by other conventional means of aeration well known in the art, including the use of diffusers, impellers, or surface aerators as symbolically indicated at 18.

The oxidized liquor leaving zone B via line 20 is introduced into the settling tank or clarifier 21. The dense settled sludge layer is removed from the bottom of tank 21 by line 23 while the clarified liquor is withdrawn at or near the surface level by line 22. A predetermined portion of the settled sludge is withdrawn by pump 26 for recycle, the rest being discharged through line 25.

The recycle sludge withdrawn by pump 26, in practice of the present invention, is passed into the extra holding tank 30 which constitutes the recycle holding zone, wherein further aging of the recycle sludge for removal of contained $NO_x^-$ therefrom is had before introduction of the recycled sludge into the true anaerobic zone A. The hydraulic detention time in the recycle holding zone is dependent upon both the $NO_x^-$ concentration present in the recycle stream and the denitrification rate. If desired, the rate of denitrification in the recycle holding zone may be increased by the addition of a utilizable carbon source but this would entail added operating costs and result in increased sludge production.

While in preferred practice of the invention, in most instances all of the wastewater influent would be initially introduced into the true anaerobic zone of the A/O system, in some instances it may be desired to introduce part of the wastewater influent into the sludge recycle holding zone 30 for admixture with the recycle sludge, as indicated by line 31 in the drawing. In doing so, a small amount of carbonaceous material in the form of BOD contained in the influent wastewater would be utilized in basin 30, thereby accelerating the rate of denitrification.

The recycle holding zone 30 may be lightly stirred but care should be taken to avoid aeration of the recycled sludge. The DO content should not exceed about 0.2 ppm and should preferably be nil.

Operation according to the invention was tested in a laboratory unit employing synthetic wastewater as the source of influent. The test unit was operated to provide a nominal residence time (NRT) of 45 minutes in the anaerobic zone and 90 minutes in the oxic zone. The recycle sludge obtained by clarification of the oxidized mixed liquor, was subjected to nitrogen sparging for 70 minutes to provide the equivalent of an anaerobic recycle holding zone, following which the recycle sludge was contacted with fresh influent which marked the beginning of a new A/O cycle.

As part of the experimental program, the soluble P concentration was measured periodically as was the $NO_x^-$ concentration in the effluent, final oxic and final recycle samples. The data obtained over a continuous three month period was recorded and time plots of the parameters prepared. During the test period, the soluble F/M ratio ranged between 0.20 and 0.25 per day while the soluble influent $BOD_5$/P ratio averaged about 15. During the initial third of the test period, overall P removal was erratic, ranging from no significant P removal to almost complete removal of P. During that same third of the total operation period the experimental unit exhibited high levels of nitrification and produced up to 15 mg/L of $NO_x^-$ expressed as elemental nitrogen, i.e. $NO_x$–N, by the end of the oxic treatment. The holding period for the recycle sludge was not long enough to achieve complete denitrification. As a result of this, up to 4 mg/L of $NO_x^-$ was observed in the final recycle samples. Thus, the erratic phosphorus removal exhibited during its period is explained by the carryover of $NO_x^-$ into the anaerobic treatment via the recycle sludge. It was of interest to know that due to the short residence time of the sludge in the clarifier mode, there was insufficient residence time to produce sufficient bubbles of nitrogen gas to raise the sludge to the surface of the clarifier.

In the next portion of the test period the concentration of ammonium nitrogen was reduced from about 20 mg/L to below 15 mg/L. As a result, nitrification was limited and the total production of $NO_x$–N produced fell to a maximum of about 10 mg/L. During the month of operation under the stated conditions of reduced ammonium nitrogen in the wastewater influent, the unit evidenced "rising sludge". This was observed to be due to formation of excessive bubbles of nitrogen gas which carried the sludge which had settled originally to the surface and therefore prevented recycle of the sludge back to the system. During the next three week period production of $NO_x$–N varied between 4 mg/L and 10 mg/L. During this same time period, only trace levels of $NO_x^-$ were measured in the final recycle sample, which indicated that the anaerobic recycle holding period was now long enough to achieve complete denitrification and the amount of nitrogen produced was insufficient to produce "rising sludge". As a result, P removal was found to have increased significantly, achieving an average efficiency of 90%. Thus, the effectiveness of a system according to the invention was demonstrated. The provision of a recycle holding period of sufficient duration for the recycle sludge obtains successful removal of $NO_x^-$, enabling desired removal of phosphorus and BOD in the subsequent anaerobic and oxic zones.

By the inclusion of the recycle sludge holding zone in a wastewater treating system operating in the A/O or the $A^2$/O mode, extended flexibility of operation is achieved independent of the detention time provided in the settler 21. Thus an additional control i.e., the sludge holding tank of the present invention, has provided a system wherein rising sludge is a problem in a nitrifying A/O system. The sludge holding tank of the present invention also precludes the discharge of excessive nitrogen in the clarifier, thus avoiding the cause of "rising sludge".

Even in those prior A/O systems which are so designed and closely controlled that satisfactory phosphate removal is had by controlling the residence time of sludge in the clarifier, upsets may occur at times resulting in carryover of $NO_x^-$ by the recycled sludge into the anaerobic zone, eventually resulting in loss of the phosphate removing potentials. By the provision in such prior systems of an extra basin for extending the detention period for the recycled sludge, there is less probability of upsets.

While in systems of the $A^2/O$ type at least part of the $NO_x^-$ formed in the oxic zone is converted to elementary internal internal recycle of mixed liquor to the anoxic zone, even in such $A^2/O$ systems the provision of the sludge recycle holding zone will be beneficial from the standpoint that in addition to providing further flexibility of operation.

The hold time in the zone 30 of FIG. 1 of the present invention is a function of concentration of $NO_x$ in the recycle sludge, the concentration of sludge in the recycle stream and the rate of denitrification of the sludge. In general, it has been found that minimum time of about 30 minutes for those systems containing high concentration of sludge with high denitrification rates is adequate while both systems containing lower concentrations of sludge with lower denitrification rates can require up to four hours of detention time in the hold tank.

The above mentioned systems i.e., Drnevich, deal with a situation in which sludge from the clarifier is subject to anaerobic conditions in order to release phosphorus from the sludge thus creating a starvation condition which enables the sludge upon introduction to abundant inorganic phosphate to absorb amounts of phosphorous in excess of that which they would normally absorb. This is in distinct contrast to the A/O system in which the anaerobic zone is also the zone in which the food is distributed to the biomass. This zone serves as a population selection zone in which only those organisms which are capable of absorbing BOD under anaerobic condition can have access to the food. Upon repeated recycle of this system the stress produces a steady state organism which has a high capacity to remove phosphorus. As evidenced by phosphorus content from five to ten weight percent expressed as elemental phosphorus. It should be emphasized that the A/O process is biologically dissimilar from the luxury uptake in that nowhere in the system is "phosphorus starvation" induced.

What is claimed:

1. In a process for treating wastewater wherein phosphate-containing recycled activated biomass is first admixed in an anaerobic zone with an influent containing phosphate and BOD to form a mixed liquor and treated under anaerobic conditions such as to be substantially free of oxidizing agents and at a dissolved oxygen concentration in said mixed liquor of less than 0.7 ppm and BOD in the influent is sorbed by the biomass with release of phosphorus from the biomass: and wherein the anaerobically treated mixed liquor is subjected to contact with oxygen-containing gas under oxic conditions followed by settling of the oxically treated mixed liquor to separate out a dense sludge layer comprising activated biomass, a portion of which dense sludge is recycled to provide the biomass first admixed with said wastewater influent: the improvement which comprises introducing at least a portion of said recycled sludge, prior to its admixture with the wastewater influent, to a holding zone in which it is held under non-aeration conditions for a period of time at least sufficient to reduce any nitrates and/or nitrites contained therein, such that no significant amount of such nitrates and/or nitrites are introduced into said anaerobic zone.

2. The method as defined in claim 1 wherein said recycled sludge portion is retained in said holding zone for a period of at least 30 minutes.

* * * * *